United States Patent
Roeser et al.

(10) Patent No.: US 6,536,546 B2
(45) Date of Patent: Mar. 25, 2003

(54) METHOD FOR SHORTENING THE STARTING TIME OF CO OXIDATION CATALYTIC CONVERTERS IN MOBILE FUEL CELL SYSTEMS

(75) Inventors: Thomas Roeser, Dettingen/Teck (DE); Carlo Saling, Dettingen/Teck (DE); Matthias Wolfsteiner, Kirchheim (DE)

(73) Assignee: Ballard Power Systems AG, Kirchheim Teck-Nabern (DE)

( * ) Notice: Subject to any disclaimer, the term of this patent is extended or adjusted under 35 U.S.C. 154(b) by 0 days.

(21) Appl. No.: 09/805,463

(22) Filed: Mar. 14, 2001

(65) Prior Publication Data
US 2001/0035694 A1 Nov. 1, 2001

(30) Foreign Application Priority Data

Mar. 14, 2000 (DE) .......................... 100 12 224

(51) Int. Cl.[7] ................................. B60K 1/00
(52) U.S. Cl. ..................... 180/65.1; 429/19; 429/40
(58) Field of Search .................. 95/90, 128, 140, 95/117; 96/108; 429/19, 20, 34, 40; 422/171, 177, 189, 190, 192, 211; 423/230, 247, 705, 245.3, 213.5; 180/65.1, 65.2, 65.3, 65.4, 65.5, 65.6–65.8, 69.4

(56) References Cited

U.S. PATENT DOCUMENTS

| | | | | |
|---|---|---|---|---|
| 1,787,875 A | * | 1/1931 | Perrott et al. | 96/108 |
| 4,838,901 A | * | 6/1989 | Schmidt et al. | 95/90 |
| 5,149,600 A | * | 9/1992 | Yamase et al. | 429/17 |
| 5,248,566 A | * | 9/1993 | Kumar et al. | 429/19 |
| 5,604,047 A | * | 2/1997 | Bellows et al. | 429/19 |
| 5,612,012 A | * | 3/1997 | Soma et al. | 423/246 |
| 5,846,298 A | * | 12/1998 | Weist, Jr. | 95/138 |
| 6,033,460 A | * | 3/2000 | Snow | 95/117 |
| 6,106,963 A | * | 8/2000 | Nitta et al. | 429/19 |
| 6,168,772 B1 | * | 1/2001 | Watanabe | 423/247 |
| 6,284,398 B1 | * | 9/2001 | Kiryu | 429/19 |
| 6,299,853 B1 | * | 10/2001 | Boneberg et al. | 423/652 |
| 6,350,423 B1 | * | 2/2002 | Aoyama | 423/247 |

* cited by examiner

Primary Examiner—Brian L. Johnson
Assistant Examiner—Bryan Fischmann
(74) Attorney, Agent, or Firm—Crowell & Moring LLP

(57) ABSTRACT

A method for shortening the cold starting time of a CO oxidation catalytic converter in a vehicle with an integrated fuel cell system. According to the invention, gas components which delay the start are removed from the reformate gas of the gas-generating system using an adsorber during the cooling-down phase after the vehicle has been switched off.

16 Claims, 3 Drawing Sheets

METHOD FOR SHORTENING THE STARTING TIME OF CO OXIDATION CATALYTIC CONVERTERS IN MOBILE FUEL CELL SYSTEMS

BACKGROUND AND SUMMARY OF THE INVENTION

The invention relates to a method for shortening the cold starting time of a CO oxidation catalytic converter in vehicles with an integrated fuel cell.

After a vehicle with an integrated fuel cell system has been operating, $H_2O$ and fuel (for example methanol) condense out of the reformate gas of the gas-generating system on the surface (for example platinum) of the CO oxidation catalytic converter owing to the cooling down of the reformate gas. In addition, after the vehicle has been operating, the CO oxidation catalytic converter is coated with CO by chemisorption. As a result, the pores and active centers on the surface of the CO oxidation catalyst are coated. Thus, depending on the degree of coverage of the surface of the catalyst by these gas components, the ignition temperature level of the catalytic converter is raised, as a result of which the starting time of the catalytic converter is lengthened in the case of cold starting. In an extreme case, ignition may even be prevented. When water is present, icing up of the catalytic converter may even occur at low temperatures.

The object of the invention is therefore to provide a method which reliably decreases or eliminates coating of the pores and active centers of the surface of the catalyst by gas components which delay the start after the vehicle has been switched off.

This and other objects and advantages are achieved by the method and apparatus according to the invention, in which gas components that delay the start are removed from the reformate gas of the gas-generating system by means of an adsorber, during the cooling-down phase after the vehicle has been switched off. In particular, it is possible to adsorb condensing components such as water or fuel (for example, methanol and CO). Therefore, at the next cold start, the surface of the CO oxidation catalyst is thus free of such components which delay the start. As a result, the starting time of the CO oxidation catalytic converter can be shortened and the CO emissions decreased.

According to the invention, the gas components which delay the start are depleted out of the reformate gas by adsorption after the vehicle has been switched off. The gas components which are to be adsorbed out of the reformate gas are conveyed to the adsorber by means of, in particular, diffusion processes. In order to accelerate these conveying processes, it is possible to meter in secondary air upstream of the adsorber. Coating of the surface of the CO oxidation catalyst with $H_2O$, fuel (for example methanol) and CO when the reformate gas cools down can thus be reduced. Effective adsorption of the gas components can be achieved in particular by means of the following properties of the adsorber and of the adsorber material:

suitable adsorption isotherms for the substances to be adsorbed. That is, the adsorber material has, for example a high selectivity and affinity with respect to $H_2O$, for example a zeolite with hydrophilic properties (molecular sieve 13x).

increased contact area between the reformate gas and the adsorber. This achieves faster desorption kinetics (in particular during the operating phase) and faster adsorption kinetics (during the cooling-down phase after the vehicle has been switched off).

availability of a high adsorptivity of the adsorber material even at temperatures above the dew point of the reformate gas (typically 80–85° C. for __(water)=1.3).

the adsorber material having a high degree of flowability in order to prevent agglomeration of the adsorber material at high coating levels.

the material having a high settled apparent density of the adsorber (diameter of the pellets used is less than 2 mm) and a high degree of porosity; and a high mechanical stability of the adsorber material. In particular, particle fractions as a result of abrasion should be avoided.

In one embodiment according to the invention, the adsorber is arranged downstream of the CO oxidation catalytic converter in the fuel cell system. In this case, it is necessary to take into account the fact that a highly exothermic reaction occurs in the reformer at which the reformate gas is produced, and the reformate gas is thus strongly heated at this point. As a result, a temperature gradient forms from the reformer via the CO oxidation catalyst to the adsorber connected downstream. In the cooling-down phase after the vehicle has been switched off, the adsorber continues to be at a lower temperature level than the CO oxidation catalyst, as a result of which it is possible to load the adsorber to a greater degree with gas components which delay the start. In order to improve the temperature difference between the adsorber and CO oxidation catalyst further, the adsorber can be cooled either actively or passively.

However, in a further arrangement according to the invention it is possible, given appropriate cooling, also to arrange the adsorber upstream of the CO oxidation catalytic converter.

In order to achieve a high adsorption yield at the adsorber it is also possible for the reformer to be thermally insulated.

The adsorber can be desorbed during the operating phase of the vehicle. To do this, the adsorber is desorbed to the moisture level of the reformate gas. The desorption processes which occur here are predominantly displacement desorption (as a result of $CO_2$, for example) and thermal desorption at temperatures of the reformate gas below 100° C.

For faster and more effective desorption of the adsorber, it is possible according to the invention to meter in air, for example compressor air from an air metering point, upstream of the adsorber during the operating phase of the vehicle. However, the desorption can also take place after the vehicle has been switched off, preferably directly after the vehicle has been switched off, before the CO oxidation reactor has reached the dew point. Air can also be metered into the reformate gas for this purpose.

In one preferred embodiment, use is advantageously made of an adsorber which is bounded by an outer casing with a cylindrical pipe passing through it, in which the reformate gas flows. The space between the outer casing and the pipe is filled with the adsorber material. The part of the pipe which is located within the outer casing is perforated. In this context it is possible, for example, to use a mesh wire. The diameter of the perforations must be smaller here than the diameter of the adsorber material which is in the form of a bulk material.

An advantage of the described adsorber is that when it is used there is no pressure drop, or only a very small pressure drop in the reformate stream. In addition, the separation of the pipe and the adsorber material according to the invention minimizes mechanical abrasion of the adsorber material.

In one advantageous embodiment, the dwell time of the reformate gas within the adsorber can be prolonged by means of twists in the pipe. The exchange surface between the gas and adsorber material can also be increased by structuring the surface of the pipe. This results in a higher adsorption yield of the gas components from the reformate gas which delay the start.

Other objects, advantages and novel features of the present invention will become apparent from the following detailed description of the invention when considered in conjunction with the accompanying drawings.

DETAILED DESCRIPTION OF THE DRAWINGS

Figure 1A:
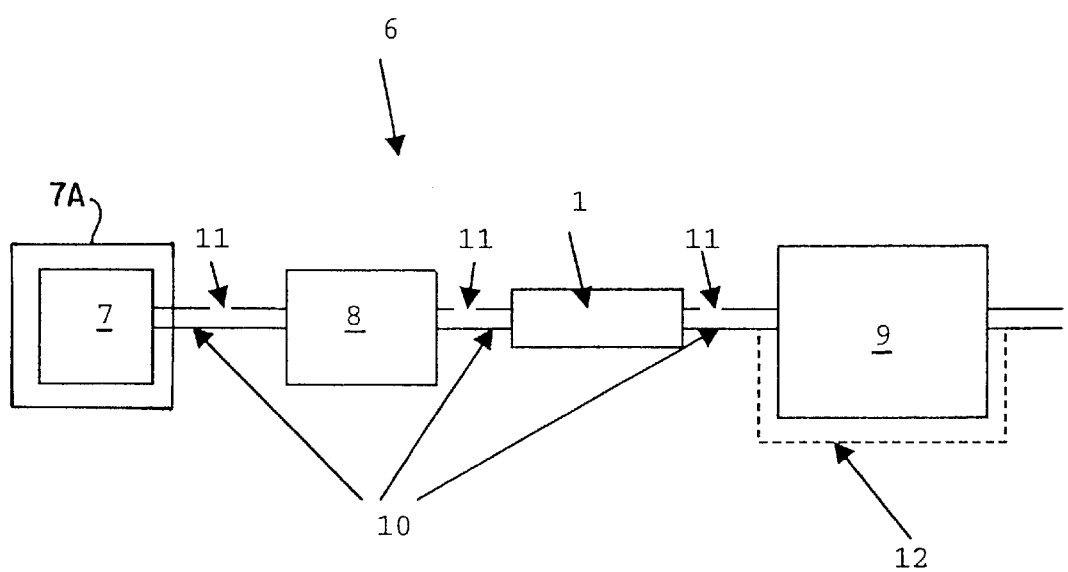
FIGS. 1a and 1b show the connection scheme in alternative embodiments of an adsorber according to the invention in the gas flow of a fuel cell system.
Figure 1B:
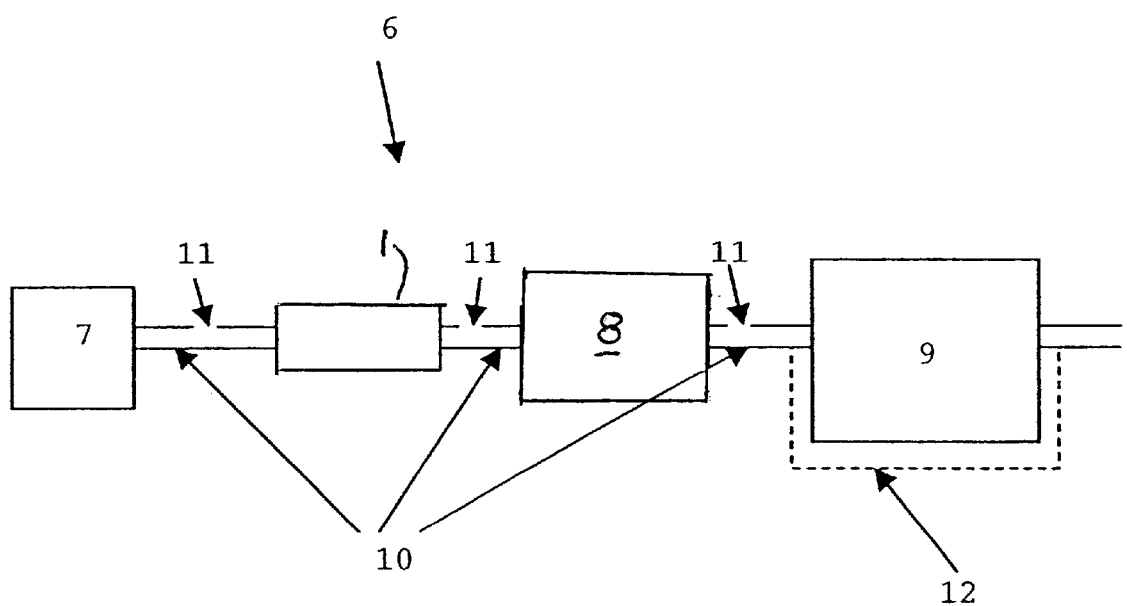

FIG. 1a shows the arrangement of the adsorber 1 in the gas flow of the fuel cell system 6. The fuel cell system 6 comprises a gas-generating system 7 for generating the reformate gas, a CO oxidation catalytic converter 8 for oxidizing the CO out of the reformate gas and a fuel cell 9. In FIG. 1a the adsorber 1 according to the invention is arranged downstream of the CO oxidation catalytic converter, while in FIG. 1b, the order is reversed. In each case an opening 11, through which air can be metered into the reformate gas, is provided in the feed lines 10.

Figure 2:
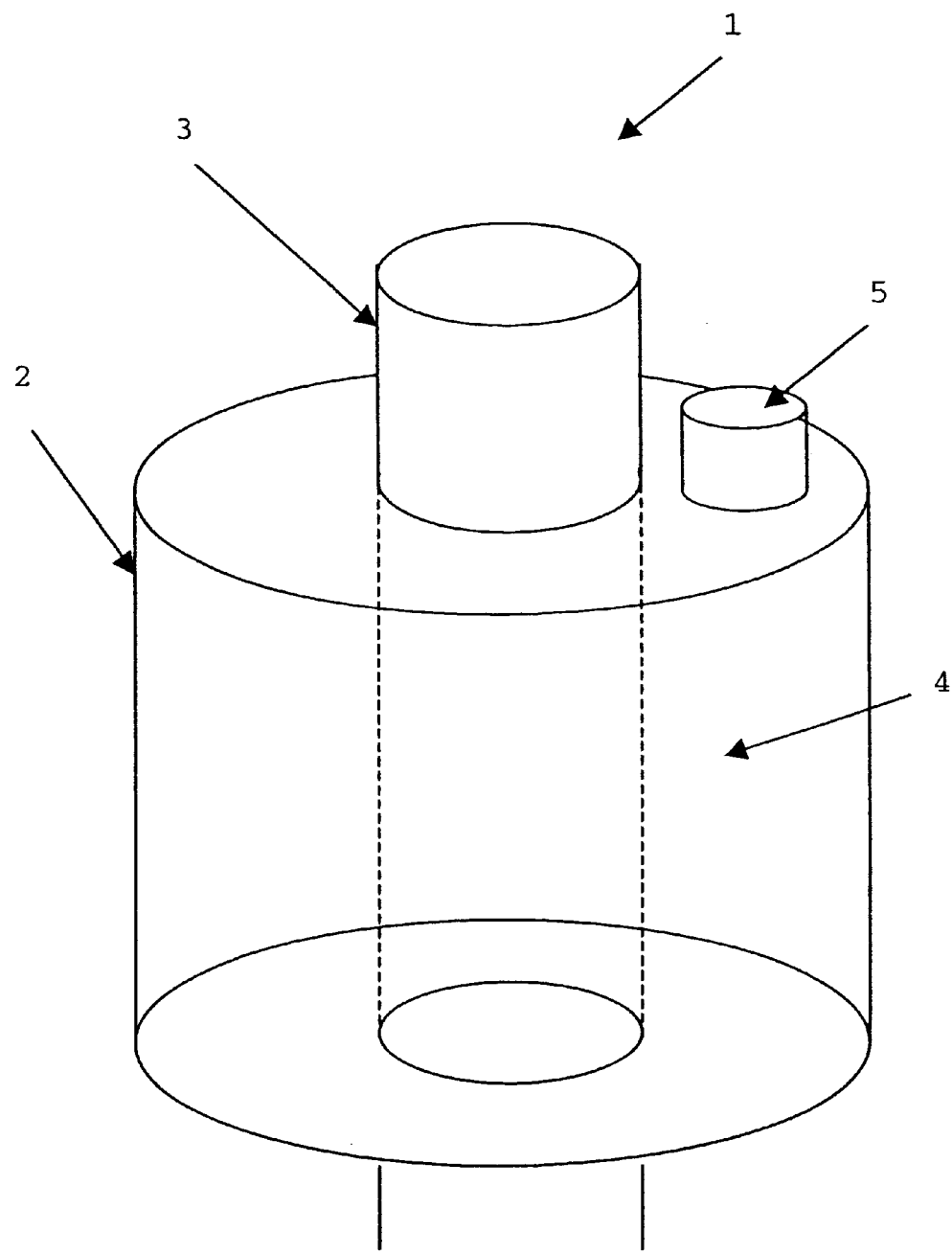
FIG. 2 shows the design of an adsorber according to the invention.

The adsorber 1, in the form which can be advantageously used in the method according to the invention, is composed according to FIG. 2 of an outer casing 2 with a cylindrical pipe 3 passing through it. (The part of the pipe 3 which is located in the interior of the outer casing 2 is indicated by broken lines for reasons of clarity.) An adsorber material 4 is located in the space between the outer casing 2 and the cylindrical pipe 3. A pipe connector 5, which is arranged on the outer casing 2 of the adsorber 1, is used for charging the adsorber 1 with the adsorber material 4. According to FIG. 2 the position of the pipe connector is not restricted.

During an operating phase, the reformate gas flows through the feed line 10 into the CO oxidation catalytic converter 8. From there, it flows via the feed line 10 through the adsorber 1 into the fuel cell 9. The adsorber 1 is desorbed owing to the comparatively high temperature of the reformate gas during the operating phase, the moisture content of the adsorber material 4 being adapted to the moisture content of the reformate gas by desorption processors. Additional secondary air can be fed into the reformate gas through one or more openings 11, as a result of which the desorption processes can be accelerated. After the vehicle has been switched off, the fuel cell 9 is disconnected from the gas flow and the gas thus passes through the bypass 12. Because the adsorber 1 is farther from the hot gas-generating system than the CO oxidation catalytic converter 8, the adsorber 1 constitutes a heat sink at which condensation effects and deposition of the gas components which delay the start occur before said gas components can be precipitated at the CO oxidation catalytic converter 8. This effect can be further enhanced by active or passive cooling of the adsorber 1. Also, as noted previously, the reformer 7 may be thermally insulated (7A in FIG. 1a).

The gas components which delay the start are conveyed in the reformate stream to the adsorber 1 predominantly by diffusion processes. The flow rate into the feed lines 10 is increased by feeding in additional air through the openings 11, which speeds up the conveying processes. In a cold start, the ignition temperature of the CO oxidation catalytic converter 8 is thus reached more quickly, owing to the low degree of coating of the pores and active centers on the surface of the CO oxidation catalyst 8 with gas components which delay the start. In addition, in the event of a cold start, the CO emissions are reduced owing to the low degree of coating of the CO oxidation catalyst 8.

The fuel cell 9 remains advantageously disconnected from the gas flow (reformate gas flows through the bypass 12) during the cold start and is not connected back into the gas flow of the reformate gas until the CO oxidation catalytic converter 8 has been temperature-stabilized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for shortening cold starting time of a CO oxidation catalytic converter in a reformate gas stream flowing to a fuel cell system in a vehicle, said method comprising:

during a cooling-down phase after the vehicle is switched off, adsorbing from the reformate gas stream, gas components that delay starting.

2. The method according to claim 1, wherein the adsorber is arranged downstream of the CO oxidation catalytic converter.

3. The method according to claim 1, wherein the adsorber is arranged upstream of the CO oxidation catalytic converter.

4. The method according to claim 1, wherein additional air is metered into the reformate gas for the adsorption of the adsorber.

5. The method according to claim 1, wherein the adsorber is cooled.

6. The method according to claim 1, wherein the reformer at which the reformate gas is generated is thermally insulated.

7. The method according to claim 1, wherein adsorber is desorbed in at least one of an operating phase of the vehicle and a period directly after the vehicle is switched off.

8. The method according to claim 7, wherein additional air is metered into the reformate gas for the desorption of the adsorber.

9. The method according to claim 1, wherein the gas components which delay the start and which are adsorbed at the adsorber comprise at least one of CO, water and fuel.

10. The method according to claim 9, wherein the fuel is methanol.

11. A device for shortening cold starting time of a CO oxidation catalytic converter in a reformate gas stream flowing to a fuel cell in a vehicle by adsorbing gas components from the reformate gas, which gas components delay starting, said device comprising:

an adsorber disposed in said gas stream, said adsorber being operative to adsorb said gas components during a cool down phase after the vehicle is switched off; wherein the adsorber is bounded by an outer casing and comprises at least one pipe passing through the outer casing for conducting the reformate gas; and the space between the outer casing and the pipe is filled with adsorber material.

12. The device according to claim 11, wherein the pipe is perforated inside the outer casing.

13. A method for shortening cold starting of a CO oxidation catalytic converter containing a catalyst, in a reformate gas stream flowing to a fuel cell which powers operation of a vehicle, said method comprising:
   providing an adsorber element in said reformate gas stream;
   switching said vehicle off following a period of operation;
   during a cool down period following switching of said vehicle, said adsorber element adsorbing gas components in said gas stream, which gas components can delay starting of said CO oxidation catalytic converter by condensing on said catalyst.

14. A method according to claim 13, further comprising:
   during an operation period of said vehicle, desorbing said gas components from said adsorber element.

15. A method for shortening cold starting time of a CO oxidation catalytic converter in a vehicle having a gas generator that supplies a fuel containing gas stream to a fuel cell which powers operation of said vehicle, with said CO oxidizing catalytic converter positioned in said gas stream between said gas generator and said fuel cell, said method comprising:
   providing an adsorber element in said gas stream; and
   during a cool down phase following an operation period of said vehicle, said adsorber element adsorbing gas components in said gas stream, which gas components can delay starting of said CO oxidation catalytic converter by depositing therein.

16. A method according to claim 15, further comprising:
   desorbing said gas components from said adsorber element during an operation period of said vehicle.

* * * * *